(No Model.)
P. H. STANDISH.
DIE FOR WELDING AND SWAGING LINKS.
No. 269,338. Patented Dec. 19, 1882.
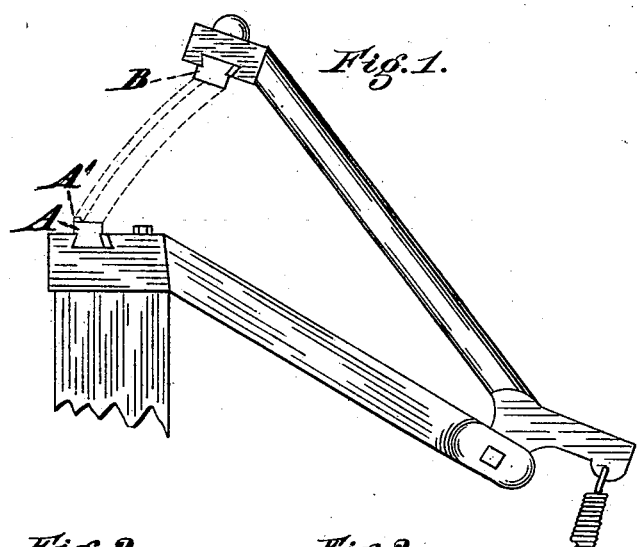
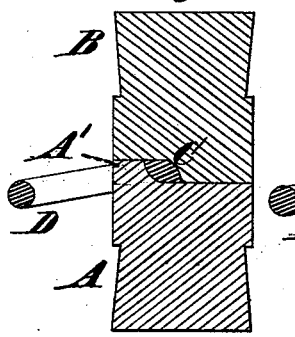 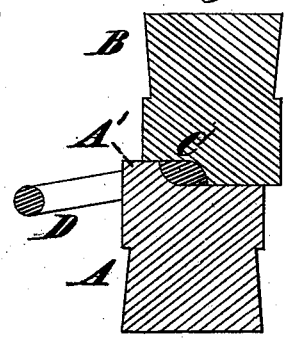 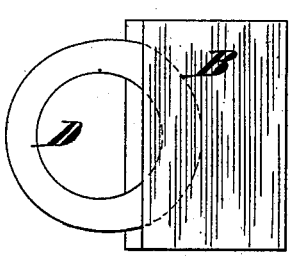
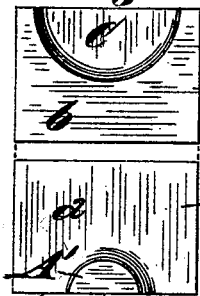 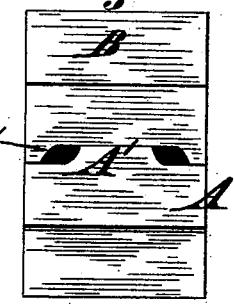 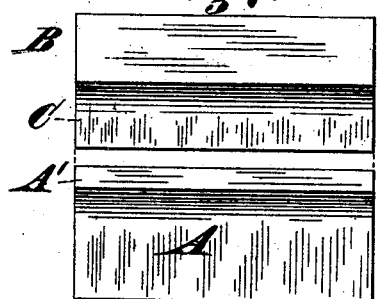
Attest,
Jno. E. Stiles
Jno. E. Jones
Inventor,
Philander H. Standish
by Wood & Boyd
his attorneys &c.

UNITED STATES PATENT OFFICE.

PHILANDER H. STANDISH, OF CINCINNATI, OHIO, ASSIGNOR OF ONE-HALF TO P. WILSON & SONS, OF SAME PLACE.

DIE FOR WELDING AND SWAGING LINKS.

SPECIFICATION forming part of Letters Patent No. 269,338, dated December 19, 1882.

Application filed July 15, 1882. (No model.)

*To all whom it may concern:*

Be it known that I, PHILANDER H. STANDISH, a citizen of the United States, residing at the city of Cincinnati, in the county of Hamilton and State of Ohio, have invented certain new and useful Improvements in Dies for Welding and Swaging Links, of which the following is a specification.

My invention relates to an improvement in dies for welding and swaging metal links or bars, which may be used in connection with the machine shown and described in Letters Patent No. 258,493, granted to me May 23, 1882, or any other adapted to strike an oblique blow. One of these dies, preferably the lower or stationary one, is made with a projection upon its face of such form as it is desired to swage the blank, and the other die is made with a cavity to conform to such projection. I thus have two lines of parting between the dies—one inside and one outside of the blank space, and separated by the thickness of the stock to be welded; and the invention consists principally in having those two separating-lines parallel, so as to admit of a lateral adjustment to contract the space or cavity, as the same may be necessary to compensate for wear, so as to enlarge the same when heavier stock is to be welded. This adjustability of the dies in a line with the plane of the separation admits of the making of square or rectangular forms of various sizes.

Figure 1 shows the dies in position for operation. Fig. 2 is a central vertical section of the dies, showing a link in the welding position before the fin has been turned. Fig. 3 is a similar view with the dies adjusted for a larger weld. Fig. 4 is a top plan view of the dies adjusted to enlarge the link-space. Fig. 5 is a plan view of the welding-faces of two link-dies. Fig. 6 is a front elevation of two similar dies, and Fig. 7 is a plan view of the faces of two dies for welding straight forms.

A represents the anvil or stationary die. It is provided with a semicircular ledge, A', inclining upward from the face of the die, and of a shape to conform to the interior circle of the link when welded or to the configuration of one side of a straight bar or rod, as shown in Fig. 7.

B represents the welding-die, which is provided with a plain face, b, adapted to strike and rest upon the plain face a of the die A.

C represents a circular recess sunk in the face of the die B, and of much larger area than the projecting ledge A' of the die A, which seats therein in the act of welding. Between the projecting ledge A' and the rim of the recess C is a sufficient space to allow the link-blank D to rest in while it is being progressively shaped under the swaging action of the dies, which takes place as follows:

Figs. 2 and 3 represent the dies in position for commencing the action of welding, with the faces of the dies A and B in contact and the link-blank in position for receiving the first action of the dies. As the welding action proceeds the die B advances slightly forward upon the face of the die A, thereby giving the proper form and shape to the link as the welding operation is completed.

It is important to have the recess in one of the dies as deep as the thickness of the metal blank which is to be welded and a corresponding amount of projection on the face of the opposite die with the lesser semicircular area, so as to seat in the recess in the manner herein shown and described. This shape of dies enables the links to be made of uniform shape and size, and a smooth semicircular surface finish of the links, obviating all roughness and fins which would otherwise occur.

I claim—

The herein-described die for welding or swaging, consisting of the parts A A' and B C, inclosing a space for the metal blank, and having their contacting faces inside and outside of the curved space parallel, and the lower line of separation on a plane with the base of the projection A', whereby they may be adjusted on the line of separation, as and for the purpose set forth.

In testimony whereof I have hereunto set my hand in the presence of two subscribing witnesses.

PHILANDER H. STANDISH.

Witnesses:
JNO. E. JONES,
ADOLPH GLUCHOWSKY.